(12) United States Patent
Milcheck

(10) Patent No.: US 11,388,918 B2
(45) Date of Patent: *Jul. 19, 2022

(54) METHODS AND MATERIALS FOR COLORING EGGS INCLUDING THE SELECTIVE PREVENTION OF THE PENETRATION OF A DYE TO AN EGGSHELL

(71) Applicant: Kevin James Milcheck, Mount Dora, FL (US)

(72) Inventor: Kevin James Milcheck, Mount Dora, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,597

(22) Filed: Apr. 25, 2020

(65) Prior Publication Data

US 2020/0253246 A1    Aug. 13, 2020

Related U.S. Application Data

(63) Continuation-in-part of application No. 16/501,390, filed on Apr. 4, 2019, now Pat. No. 10,968,365, and a continuation-in-part of application No. 15/732,770, filed on Dec. 26, 2017, now Pat. No. 10,689,555.

(51) Int. Cl.
*A23L 5/42* (2016.01)
*A23P 20/10* (2016.01)

(52) U.S. Cl.
CPC ............. *A23L 5/42* (2016.08); *A23P 20/11* (2016.08)

(58) Field of Classification Search
CPC .................................. C09D 191/06; C09D 5/008
See application file for complete search history.

(56) References Cited

U.S. PATENT DOCUMENTS

| | | | | |
|---|---|---|---|---|
| 1,829,689 A * | 10/1931 | Townley | ................. | B05D 5/061 426/300 |
| 4,371,555 A * | 2/1983 | Tully | ................... | A23L 15/00 426/104 |
| 5,565,229 A * | 10/1996 | Mandle | ................. | B44D 3/00 426/250 |
| 5,693,352 A * | 12/1997 | Vogel Goodman | ..... | B44D 2/00 118/13 |
| 6,045,592 A * | 4/2000 | Paquin | ................... | D06P 1/445 434/84 |
| 6,110,514 A * | 8/2000 | Powers | ................... | B44D 3/00 426/104 |
| 6,260,480 B1 * | 7/2001 | Bardeen | ................ | A47J 43/14 99/495 |
| 6,386,138 B1 * | 5/2002 | Schramm | ............ | A63H 33/28 118/13 |
| 6,851,883 B1 * | 2/2005 | Lamond | ................ | B43K 8/02 401/198 |
| 9,446,623 B2 * | 9/2016 | Black | ....................... | B44C 5/00 |
| 2007/0210594 A1 * | 9/2007 | Wong | ..................... | B44D 2/002 294/14 |
| 2018/0223103 A1 * | 8/2018 | Schweinfurth | ........ | A23P 20/10 |

FOREIGN PATENT DOCUMENTS

| | | | | |
|---|---|---|---|---|
| DE | 102005006957 A1 | * | 8/2006 | ............... B44D 3/00 |
| RU | 2162868 C2 | * | 2/2001 | |
| RU | 2281964 C2 | * | 8/2006 | |

OTHER PUBLICATIONS ip.com—English Machine Translation of DE 102005006957 (Year: 2006).*
ip. com English Machine Translation RU 216868 (Year: 2001).*
ip. com English Machine Translation RU 2281964 (Year: 2006).*

* cited by examiner

*Primary Examiner* — Nina Bhat

(57) ABSTRACT

The method is for making a coating for use in reducing penetration of food dyes on an egg shell surface. The method includes admixing an edible salt compound with water in combination with a hydroxide, optionally adding an acid to lower the pH of the mixture; optionally adding a sugar alcohol; optionally adding, and mixing in, one or more of water and a food grade acid, bacterial alpha amylase, a plasticizer, a sugar, starch, cellulose/cellulose esters, gelatin, agar, gluten, casein, and protein, adding a food grade emulsifier and a fatty acid to the mixture, optionally adding a food grade clay to the mixture, heating the mixture to a temperature between 135-200° F. and adding a food grade wax, and optionally adding a silicone, cooling the mixture to produce the coating for application onto the egg shell surface.

16 Claims, No Drawings

METHODS AND MATERIALS FOR COLORING EGGS INCLUDING THE SELECTIVE PREVENTION OF THE PENETRATION OF A DYE TO AN EGGSHELL

RELATED APPLICATIONS

This application claims the priority benefit of, and is a Continuation-in-Part (CIP) Application of, U.S. application Ser. No. 15/732,770 filed Dec. 26, 2017 and titled "Formulation to Stop the Adherence of a Dye to an Eggshell" and also a CIP Application of U.S. application Ser. No. 16/501,390 filed Apr. 4, 2019 and titled "Formulation to Stop the Adherence of a Dye to an Eggshell, Improvement" which are incorporated herein in their entirety by reference.

FIELD OF THE INVENTION present invention relates to the field of egg coloring, and more particularly, to food-safe materials, systems and methods for coloring eggs with multiple colors.

BACKGROUND OF THE INVENTION

Coloring eggs with multiple colors is challenging. One could put a sticker on an egg, dye that egg, remove the sticker and dye the egg in a second color and thus get a two color egg. The only problem was the original color that was utilized would now be changed.

Another approach involved the use of a wax crayon or melted wax, allowing a user to write on an egg and locally prevent dye from coloring the eggshell. This is a very inefficient approach, making it utterly impossible to achieve acceptable results.

Also, there are several approaches that utilize sugar as an adhesive, while decreasing the actual solubility of the sugar, which may have some positive results. For example, a method of producing an adhesive composition is disclosed in U.S. Pat. No. 6,613,378 to Erhan et al.

There may be products on the market that use wax or a product that is not consumer edible and thus not safe for children. Utilizing wax is difficult and not particularly safe for children to use. Vaseline or other petroleum type products might have some effectiveness, but lack the safety needed for use by children or adults for that matter.

This background section is intended to introduce the reader to various aspects of typical technology that may be related to various aspects or embodiments of the present invention, which are described and/or claimed below. This discussion is believed to be useful in providing the reader with background information to facilitate a better understanding of the various aspects and embodiments of the present invention. Accordingly, it should be understood that these statements are to be read in light of, and not as admissions of, the prior art.

SUMMARY OF THE INVENTION

It is an object of the present embodiments to provide an easy and effective approach to dye Easter Eggs in a multitude of colors and designs.

This and other objects, advantages and features in accordance with the present embodiments may be provided by a method of making a coating for use in reducing penetration of food dyes on an egg shell surface, the method comprising: a) admixing an edible salt compound with water in combination with a hydroxide where the molar weight of hydroxide to water is in a range of 1:1 to 1:30 to form a mixture; b) optionally adding an acid to lower the pH of the mixture; c) optionally adding a sugar alcohol to the mixture; d) optionally adding, and mixing in, one or more of: water and a food grade acid, bacterial alpha amylase, a plasticizer, a sugar, starch, cellulose/cellulose esters, gelatin, agar, gluten, casein, protein and then heating until fully incorporated or until water is evaporated or nearly evaporated and caramelization occurs; adding a food grade emulsifier and a fatty acid to the mixture separately or together as a combination; optionally adding a food grade clay to the mixture; heating the solution to a temperature between 135-200° F. and adding a food grade wax; optionally adding a silicone; and cooling the mixture to produce the coating for application onto the egg shell surface.

Additionally, and/or alternatively, the plasticizer may be a sugar alcohol including one or more of glycerin, arabitol, erythritol, glycitol, lactitol, maltitol, mannitol, sorbitol, and xylitol or combination thereof.

Additionally, and/or alternatively, the sugar of step d) may be one or more of monosaccharides including glucose or fructose, disaccharides including sucrose, lactose, or maltose, polysaccharides including cellulose, glycogen, oligosaccharides or combinations thereof.

Additionally, and/or alternatively, the starch of step d) may be one or more of rice, wheat, maize, potatoes, cassava, acorns, arrowroot, arracacha, bananas, barley, breadfruit, buckwheat, canna, colocasia, katakuri, kudzu, malanga, millet, oats, oca, Polynesian arrowroot, sago, sorghum, sweet potatoes, rye, taro, chestnuts, water chestnuts, yams, beans, favas, lentils, mung beans, peas, and chickpeas or combinations thereof.

Additionally, and/or alternatively, the cellulose may be one or more of hydroxypropyl cellulose (HPC), hydroxypropyl methylcellulose (HPMC), carboxymethylcellulose (CMC), or methylcellulose (MC) or combinations thereof.

Additionally, and/or alternatively, the food grade clay may be one or more of bentonite clay, kaolinite, montmorillonite or combinations thereof.

Additionally, and/or alternatively, the silicone may be one or more of polydimethylsiloxane and a food safe silicone, and combinations thereof.

Additionally, and/or alternatively, the method of producing a multiple colored egg may include applying the coating, and comprising: a.) applying at least one sticker to the egg shell; b.) dipping the egg in food grade food coloring of a color; c.) softening the coating and applying the coating to the egg shell; d.) removing the at least one sticker; and e.) dipping the egg in food grade food coloring of a different color to produce a multicolored egg; wherein steps b) through e) are repeated as desired.

Other objects, advantages and features in accordance with the present embodiments may be provided by a method of making a coating for use in reducing penetration of food dyes on an egg shell surface, the method comprising: a) admixing an edible salt compound with water in combination with a hydroxide where the ratio of hydroxide to water is in a range of 1:1 to 1:30 to form a mixture; b) determining the pH level of the mixture and optionally adding an acid to lower the pH of the mixture; c) optionally adding a sugar alcohol to the mixture; d) adding a food grade emulsifier and a fatty acid to the mixture separately or together as a combination; e) optionally adding a food grade clay to the mixture; f) heating the mixture to a temperature between 135-200° F. and adding a food grade wax; g) adding an adhesive to the mixture, including producing the adhesive by: admixing sugar, water and a polyfunctional acid to form a second mixture, wherein the molar ratio of sugar to water is in the range of 1:2 to 1:60 and the acid is present in the second mixture at about 2-16% by weight, heating the second mixture to boiling temperature, and maintaining the mixture at boiling temperature until the sugar is substantially cross-linked by the acid to yield the adhesive composition; h) optionally adding a silicone; and i) cooling the solution to produce the coating for application onto the egg shell surface.

Additionally, and/or alternatively, the polyfunctional acid comprises one or more of acetic, citric, glycolic, lactic, malic, tartaric, mandelic, fumaric, and phosphoric or combinations thereof.

Additionally, and/or alternatively, the food grade wax comprises one or more of beeswax (bleached and unbleached), carnuba wax, candelillia wax, paraffin wax, synthetic paraffin wax, ceresin wax, rice bran wax, microcrystalline wax or other food safe wax or combinations thereof.

Other objects, advantages and features in accordance with the present embodiments may be provided by a method of making a coating for use in reducing penetration of food dyes on an egg shell surface, the method comprising: a) admixing an edible salt compound with water in combination with a hydroxide where a ratio of hydroxide to water is in a range of 1:1 to 1:30 to form a mixture; b) optionally adding an acid to lower the pH of the mixture; c) optionally adding a sugar alcohol to the mixture; d) adding a food grade emulsifier and a fatty acid to the mixture; e) optionally adding a food grade clay to the mixture; f) heating the mixture to a temperature between 135-200° F. and adding a food grade wax; and g) cooling the mixture to produce the coating for application onto the egg shell surface.

Additionally, and/or alternatively, the method may further include, after step c) adding, and mixing in, at least one of water and a food grade acid, bacterial alpha amylase, a plasticizer, a sugar, starch, cellulose/cellulose esters, gelatin, agar, gluten, casein, protein and then heating until fully incorporated or until water is evaporated or nearly evaporated and caramelization occurs.

Additionally, and/or alternatively, the plasticizer may be a sugar alcohol including one or more of glycerin, arabitol, erythritol, glycidol, lactitol, maltitol, mannitol, sorbitol, and xylitol.

Additionally, and/or alternatively, the sugar may be at least one of monosaccharides including glucose or fructose, disaccharides including sucrose, lactose, or maltose, polysaccharides including cellulose, glycogen, oligosaccharides.

Additionally, and/or alternatively, the starch may be at least one of rice, wheat, maize, potatoes, cassava, acorns, arrowroot, arracacha, bananas, barley, breadfruit, buckwheat, canna, colocasia, katakuri, kudzu, malanga, millet, oats, oca, Polynesian arrowroot, sago, sorghum, sweet potatoes, rye, taro, chestnuts, water chestnuts, yams, beans, favas, lentils, mung beans, peas, and chickpeas.

Additionally, and/or alternatively, the cellulose comprises at least one of hydroxypropyl cellulose (HPC), hydroxypropyl methylcellulose (HPMC), carboxymethylcellulose (CMC), or methylcellulose (MC).

Additionally, and/or alternatively, the food grade clay may be at least one of bentonite clay, kaolinite, montmorillonite.

Additionally, and/or alternatively, the method may further include, after step f) adding a food safe silicone to the mixture.

DETAILED DESCRIPTION OF THE PREFERRED EMBODIMENTS

The present invention will now be described more fully hereinafter with reference to the any accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

The embodiments of the present invention allow consumers to dye Easter Eggs in a multitude of colors and designs. An element preventing consumers from achieving this was the lack of a product that is able to stop the penetration of a dye to an egg shell. What was needed was to be able to apply a product (e.g. a paste) to the egg shell that would prevent the dye from penetrating the egg shell in specific areas. If such a paste is applied over an egg and sticker, for example, and the sticker removed, one could easily decorate an egg in 1, 2, 3 or more colors utilizing the egg paste and different sticker designs.

Ease of use, cleanliness, and ability to easily apply onto an egg and easily wipe off an egg are important features of the paste. Another important element is the ability to decorate eggs with clean lines without distorting those lines (e.g. with a spoon or by dropping the egg into a glass etc.). The egg paste may preferably have a stickiness to it. So when the paste is applied to an egg it acts as a glue to mildly adhere an egg to an egg holder, (e.g. an egg holder according to features of the present invention). Such an egg holder allows one to easily place the egg into a dye and remove it without touching the surface of the egg and thus potentially ruin the coloring design or allowing the egg to touch the side of a glass or container.

Safety of the "egg paste" used with the dyes is a concern. Red #3 is a very unstable die at low ph. Formulating a dye that keeps Red #3 stable may be an important concern. So, for the safety of the consumer, it may be desirable to balance the quantities of hydroxide and magnesium sulfate in the mixture. Selective emulsifiers and alternatives may also be beneficial to the consumer and overall safety of the product.

Red #3 is a dye that naturally sticks to the outside of many materials, so the present embodiments may address this issue and include many mixtures that can be utilized with the materials set forth in this patent application Ser. No. 15/732,770. With correct mixing of the materials, one can eliminate this problem and thus get a clean egg after removing from any dye that contains Red #3.

The process of making a coating which is applied to the surface of the egg shell using a fingertip, and body heat associated with using a fingertip, to apply the coating to the egg shell prevents or eliminates penetration of food dyes to an egg shell. Specifically the method of eliminating the penetration of food dyes on egg shell surface is accomplished by making a coating which includes the steps of a.) admixing, a hydroxide, a sulfate and water wherein the ratio of hydroxide to water is 1:1 to 1:10 to form a solution; b.) determining the pH and optionally adding a an acid to lower the pH of the solution; c.) adding a sugar alcohol in an amount of up to 60% of the total weight percent of the solution; d.) adding a food grade emulsifier and fatty acid to the solution; e.) heating the solution to a temperature between 135-200° F. and adding a food grade wax; and f.) cooling the coating so it may be applied onto the egg shell surface to prevent color intrusion.

The specific type of sulfate and hydroxides in the coating may include magnesium sulfate, sodium sulfate and potassium sulfate and combinations thereof and potassium hydroxide and sodium hydroxide and combinations thereof. The polyfunctional acids used in making the coating may include citric, glycolic, lactic, malic, tartaric, mandelic, fumaric, and phosphoric acids. The specific types of sugar alcohols which can be used in the coating may include arabitol, erythritol, glycidol, lactitol, maltitol, mannitol, sorbitol, xylitol, and isomalt.

The specific types of food emulsifiers may include monoglyceride fatty acid esters including acetic acid, lactic, citric acid, succinic acid, diacetyl tartaric acid, polycerouccinic acid esters and diacetyl tartaric acid monoglyceride fatty acids. Other food grade emulsifiers include polyglycerol ester, polyglycerol polyricinoleate, sorbitrate ester, polypropylene glycol, sucrose esters and lecithin, the types of lecithins contemplated include one or more of soy, milk, egg, rapeseed, cotton seed, sunflower, peanut and wheat germ. The fatty acids which are used with the emulsifier may include the following edible oils sunflower oil, soybean oil, corn oil, cottonseed oil, canola oil, coconut oil, olive oil, palm oil, peanut oil, safflower oil, sesame seed oil, sunflower oil, hazelnut oil, almond oil, cashew oil, macadamia oil, pecan oil, pistachio oil, walnut oil, lagenaria siceraria oil, buffalo gourd oil, pumpkin seed oil, watermelon seed oil, acai oil, black currant seed oil, borage seed oil, evening primrose oil, carob pod oil, apricot oil, argon oil, artichoke oil, avocado oil, babassu oil, ben oil, borneo tallow nut oil, cohune oil, coriander seed oil, hemp oil, kapok seed oil, lallemantia oil, meadowfoam seed oil, mustard oil, okra seed oil, hibiscus esculentus oil, perilla seed oil, pine nut oil, poppyseed oil, prune kernel oil, quinoa oil, ramtil oil, rice bran oil, tea oil, thistle oil, wheat germ oil, caprylic acid, capric acid, lauric acid, cyristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, a-Linolenic acid, arachidonic acid, eicosapentaenoic acid, docosahexaenoic acid and mixtures thereof. The types of food grade waxes may include beeswax, carnuba wax, candelillia wax, and paraffin wax.

An adhesive composition is also contemplated and used in eliminating the penetration of food grade dyes when coloring or dying eggs. The composition is made by the process of a.) admixing sugar, water and a polyfunctional acid to form a mixture, wherein the molar ratio of sugar to water is in the range of 1:2 to 1:60 and the acid is present in the mixture at about 2-16% by weight; b.) heating the mixture to boiling temperature; c.) maintaining the mixture at boiling temperature until the sugar is substantially cross-linked by the acid to yield the adhesive composition. The types of sugar used in the adhesive composition may include one or more of sucrose, lactose, maltose and cellobiose, glucose, fructose, mannose, arabinose, sorbitol and combinations thereof.

The process of coloring eggs or dying eggs which include the coating and/or adhesive composition as described above is as follows. A method of using the adhesive for eliminating penetration of food dyes on an egg shell surface by applying a coating to the egg shell surface wherein the process includes: making the coating by a.) admixing, a hydroxide, a sulfate and water wherein the ratio of hydroxide to water is 1:1 to 1:10 to form a solution; b.) determining the pH level of the solution and optionally adding an acid to lower the pH of the solution; c.) adding a sugar alcohol in an amount of up to 60% of the total weight percent of the solution; d.) adding a food grade emulsifier and fatty acid to the solution; e.) heating the solution to a temperature between 135-200° F. and adding a food grade wax; and f.) adding the adhesive; and g.) cooling the solution to produce the coating for application onto the egg shell surface.

The method of producing a multiple colored egg by applying the coating is as follows: a.) applying at least one sticker to the egg shell; b.) dipping the egg in food grade food coloring of a color; c.) applying the coating to the egg shell by fingertip utilizing body heat to soften the wax and allow ease of application; d.) removing the at least one sticker; and e.) dipping the egg in food grade food coloring of a different color to produce a multicolored egg; wherein steps b) through e) are repeated as desired.

A blend of materials utilizing Water, Sodium Hydroxide, Magnesium Sulfate are blended then Maltitol may be added together to form a stable emulsion with slight heat added to blend the maltitol. A preferred method utilizing honey as an emulsifier to be able to incorporate several fatty acids as Coconut oil or similar is then added. Heat is then added to incorporate the wax material with Unbleached Beeswax as a preferred ingredient. Blending temperatures should remain as low as possible at around 160 degrees F. to prevent any burning of the wax or honey.

One can also look at many materials to replace honey that also will function as an emulsifier in this material such as High Fructose Corn Syrup or Corn Syrup which offers a less expensive alternative than Honey.

Example 1

We added 1.5% Sodium Hydroxide (50/50 in water) along with 1.0% Water and mixed, then added 3% Magnesium Sulfate Heptahydrate and mixed until fully incorporated. We then added 1.13% Maltitol adding heat at around 50 degrees C. to fully incorporate into the mix. Coconut oil at 27% was then added along with 39.47% High Fructose Corn Syrup and stirred until fully incorporated. 26.9% unbleached beeswax was then added into the mix and the temperature was raised to 65 degrees C. until fully blended.

A goal of the invention is to soften the wax in the mix and to be able to increase the amount of wax in an individual mix, thus increasing the effectiveness of the product as a whole, and increasing the barrier between the eggshell and a dye.

In Example 1, it gives one form of the wax that can be adjusted for feel by adding additional/less wax in the form of beeswax or other edible wax, or increasing or decreasing the fatty acid including coconut oil, lauric acid, myristic acid, palmitic acid or similar depending on whether a stiffening or a loosening of the material is required.

One can also look at the water content utilized in the sugar syrups as in the HFCS or similar or using a different emulsifying agent as Soy Lecithin. The addition of maltitol or similar sugar alcohol in a lesser or more degree has a distinct effect on the spreadability of the wax as does the specific polyfunctional acid utilized and the amount. One can also delve into the immense possibilities of the admixtures of the sugars and polyfunctional acids (e.g. U.S. Pat. No. 6,613,378 to Erhan et al).

The requirements of an effective wax are truly vast, given the ingredients added in the mix trying to achieve similar results. There may be many possible combinations that arise out of these potential ingredients, geared to a single outcome, namely a wax to resist an egg dye, which is easily applied and removed while providing some adhesiveness to allow the egg to be attached to an egg dipper an eliminate the egg falling off the device.

One preference of formulating this egg paste is the resistance to pull away one's finger from the egg and in essence pull some of the wax away from the surface of the egg. In essence, allowing a path for the dye to seep on the egg. The present array of contemplated formulations use the ingredients to eliminate this action from occurring.

Another aspect of the wax, it may be formulated to have glue like qualities. This may be important in view of the innovative egg holder (by the present inventor) that may be combined alongside with the egg paste. Such an egg holder may rely on the adhesive qualities of the egg paste to hold an egg onto its egg stand. The qualities of the wax, may actually allow a user to turn the egg holder on its side and even upside down, without the egg falling off of the egg stand. Without the qualities of the wax possessing adhesive qualities, the egg would easily fall off the egg stand and damage one's colored egg creation, such as a "Color Me Cool" Egg design!

The formulation shown, does not necessarily need a food grade preservative or combination of, to provide a product free of fungus and microbial growth. There are formulations that could require microbial growth and fungus protection given the degree of water incorporated and polyfunctional acids utilized, and the addition of the admixture containing sugar and polyfunctional acids. A number of different preservatives may be used depending on the final formulation of the egg paste and pH, not limited to sorbates, benzoates, sulfites, butylated hydroxytoluene and natural preservatives.

Other embodiments will now be described.

A method is for making a coating for use in reducing penetration of food dyes on an egg shell surface. The method includes: a) admixing an edible salt compound with water in combination with a hydroxide where the molar weight of hydroxide to water is in a range of 1:1 to 1:30 to form a mixture; b) optionally adding an acid to lower the pH of the mixture; c) optionally adding a sugar alcohol to the mixture; d) optionally adding, and mixing in, one or more of: water and a food grade acid, bacterial alpha amylase, a plasticizer, a sugar, starch, cellulose/cellulose esters, gelatin, agar, gluten, casein, protein and then heating until fully incorporated or until water is evaporated or nearly evaporated and caramelization occurs; adding a food grade emulsifier and a fatty acid to the mixture separately or together as a combination; optionally adding a food grade clay to the mixture; heating the solution to a temperature between 135-200° F. and adding a food grade wax; optionally adding a silicone; and cooling the solution to produce the coating for application onto the egg shell surface.

In step d) heat can be added to more easily incorporate the acid. Also, proteins such as soy proteins and others may be added. The silicone may improve barrier properties, water repellency, slip, and diminish surface imperfections.

Also, it should be noted that the list of ingredients in step d) can be added individually or in any combination as desired. For the sugars, syrups can be used or dry versions (i.e. sugar solids) with the addition of water.

The specific types of edible salts in the coating may include acetate's; ammonium acetate, calcium acetate, magnesium acetate, potassium acetate, sodium acetate, carbonate's; ammonium carbonate, ammonium bicarbonate, calcium carbonate, calcium bicarbonate, magnesium carbonate, magnesium bicarbonate, potassium carbonate, potassium bicarbonate, sodium carbonate, sodium bicarbonate, chloride's; ammonium chloride, calcium chloride, magnesium chloride, potassium chloride, sodium chloride, citrate's, triammonium citrate, calcium citrate, magnesium citrate, potassium citrate, sodium citrate, nitrate's, nitrite's; sodium nitrite, oxide's, phosphate's; monocalcium phosphate, dicalcium phosphate, tricalcium phosphate, octacalcium phosphate, amorphous calcium phosphate, monomagnesium phosphate, dimagnesium phosphate, trimagnesium phosphate, amorphous magnesium phosphate, monosodium phosphate (anhydrous), monosodium phosphate (monohydrate), monosodium phosphate (dihydrate), disodium phosphate (anhydrous), disodium phosphate (dihydrate), disodium phosphate (heptahydrate), disodium phosphate (octahydrate), disodium phosphate (dodecahydrate), trisodium phosphate (anhydrous, hexagonal), trisodium phosphate (anhydrous, cubic), trisodium phosphate (hemihydrate), trisodium phosphate (hexahydrate), trisodium phosphate (octahydrate), trisodium phosphate (dodecahydrate), monosodium diphosphate (anhydrous), disodium diphosphate (anhydrous), disodium diphosphate (hexahydrate), trisodium diphosphate (anhydrous), trisodium diphosphate (monohydrate), trisodium diphosphate (nonahydrate), tetrasodium diphosphate (anhydrous), tetrasodium diphosphate (decahydrate), sodium; monosodium phosphate (anhydrous), monosodium phosphate (monohydrate), monosodium phosphate (dihydrate), disodium phosphate (anhydrous), disodium phosphate (dihydrate), disodium phosphate (heptahydrate), disodium phosphate (octahydrate), disodium phosphate (dodecahydrate), trisodium phosphate (anhydrous, hexagonal), trisodium phosphate (anhydrous, cubic), trisodium phosphate (hemihydrate), trisodium phosphate (hexahydrate), trisodium phosphate (octahydrate), trisodium phosphate (dodecahydrate), monosodium diphosphate (anhydrous), disodium diphosphate (anhydrous), disodium diphosphate (hexahydrate), trisodium diphosphate (anhydrous), trisodium diphosphate (monohydrate), trisodium diphosphate (nonahydrate), tetrasodium diphosphate (anhydrous), tetrasodium diphosphate (decahydrate) and combinations thereof. The plasticizer may be a sugar alcohol including one or more of glycerin, arabitol, erythritol, glycitol, lactitol, maltitol, mannitol, sorbitol, isomalt and xylitol or combinations thereof. The sugar of step d) may be one or more of monosaccharides including glucose or fructose, disaccharides including sucrose, lactose, or maltose, polysaccharides including cellulose, glycogen, oligosaccharides or combinations thereof. The starch of step d) may be one or more of rice, wheat, maize, potatoes, cassava, acorns, arrowroot, arracacha, bananas, barley, breadfruit, buckwheat,

*canna, colocasia*, katakuri, kudzu, malanga, millet, oats, oca, Polynesian arrowroot, sago, sorghum, sweet potatoes, rye, taro, chestnuts, water chestnuts, yams, beans, favas, lentils, mung beans, peas, and chickpeas or combinations thereof.

The cellulose may be one or more of hydroxypropyl cellulose (HPC), hydroxypropyl methylcellulose (HPMC), carboxymethylcellulose (CMC), or methylcellulose (MC) or combinations thereof. The food grade clay may be one or more of bentonite clay, kaolinite, montmorillonite or combinations thereof. The silicone may be one or more of polydimethylsiloxane and a food safe silicone, and combinations thereof.

As described above, the method of producing a multiple colored egg may include applying the coating, and comprising: a.) applying at least one sticker to the egg shell; b.) dipping the egg in food grade food coloring of a color; c.) softening the coating and applying the coating to the egg shell; d.) removing the at least one sticker; and e.) dipping the egg in food grade food coloring of a different color to produce a multicolored egg; wherein steps b) through e) are repeated as desired.

Another method is for making a coating for use in reducing penetration of food dyes on an egg shell surface. The method includes: a) admixing an edible salt compound with water in combination with a hydroxide where the ratio of hydroxide to water is in a range of 1:1 to 1:30 to form a mixture; b) determining the pH level of the mixture and optionally adding an acid to lower the pH of the mixture; c) optionally adding a sugar alcohol to the mixture; d) adding a food grade emulsifier and a fatty acid to the mixture separately or together as a combination; e) optionally adding a food grade clay to the mixture; f) heating the mixture to a temperature between 135-200° F. and adding a food grade wax; g) adding an adhesive to the mixture, including producing the adhesive by: admixing sugar, water and a polyfunctional acid to form a second mixture, wherein the molar ratio of sugar to water is in the range of 1:2 to 1:60 and the acid is present in the second mixture at about 2-16% by weight, heating the second mixture to boiling temperature, and maintaining the mixture at boiling temperature until the sugar is substantially cross-linked by the acid to yield the adhesive composition; h) optionally adding a silicone; and i) cooling the solution to produce the coating for application onto the egg shell surface.

The polyfunctional acid comprises one or more of acetic, citric, glycolic, lactic, malic, tartaric, mandelic, fumaric, and phosphoric or combinations thereof. The food grade wax may be one or more of beeswax (bleached and unbleached), carnuba wax, candelillia wax, paraffin wax, synthetic paraffin wax, ceresin wax, rice bran wax, microcrystalline wax or other food safe wax or combinations thereof.

Another method is for making a coating for use in reducing penetration of food dyes on an egg shell surface. The method includes: a) admixing an edible salt compound with water in combination with a hydroxide where a ratio of hydroxide to water is in a range of 1:1 to 1:30 to form a mixture; b) optionally adding an acid to lower the pH of the mixture; c) optionally adding a sugar alcohol to the mixture; d) adding a food grade emulsifier and a fatty acid to the mixture; e) optionally adding a food grade clay to the mixture; f) heating the mixture to a temperature between 135-200° F. and adding a food grade wax; and g) cooling the mixture to produce the coating for application onto the egg shell surface.

The method may further include, after step c) adding, and mixing in, at least one of water and a food grade acid, bacterial alpha amylase, a plasticizer, a sugar, starch, cellulose/cellulose esters, gelatin, agar, gluten, casein, protein and then heating until fully incorporated or until water is evaporated or nearly evaporated and caramelization occurs. The plasticizer may be a sugar alcohol including one or more of glycerin, arabitol, erythritol, glycidol, lactitol, maltitol, mannitol, sorbitol, and xylitol. The sugar may be at least one of monosaccharides including glucose or fructose, disaccharides including sucrose, lactose, or maltose, polysaccharides including cellulose, glycogen, oligosaccharides.

The starch may be at least one of rice, wheat, maize, potatoes, cassava, acorns, arrowroot, arracacha, bananas, barley, breadfruit, buckwheat, *canna, colocasia*, katakuri, kudzu, malanga, millet, oats, oca, Polynesian arrowroot, sago, sorghum, sweet potatoes, rye, taro, chestnuts, water chestnuts, yams, beans, favas, lentils, mung beans, peas, and chickpeas. The cellulose may be at least one of hydroxypropyl cellulose (HPC), hydroxypropyl methylcellulose (HPMC), carboxymethylcellulose (CMC), or methylcellulose (MC). The food grade clay may be at least one of bentonite clay, kaolinite, montmorillonite. The method may further include, after step f) adding a food safe silicone to the mixture.

The embodiments described above provide for the making of a paste that can be applied to an egg to prevent dye from penetrating the covered parts of the egg. In combination with stickers or other attachable designs, the egg artist can selectively customize the egg coloring process with ease. The coatings or pastes of the invention are food safe and edible.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention.

In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

That which is claimed is:

1. A method of making a coating for reducing penetration of food dyes on—an egg shell surface, the method comprising:
   (a) admixing an edible salt compound with water in combination with a hydroxide where the molar weight of hydroxide to water is in a range of 1:1 to 1:30 to form a mixture;
   (b) adding a food grade emulsifier and a fatty acid to the mixture separately or together as a combination;
   (c) heating the solution to a temperature between 135-200° F. and adding a food grade wax; and
   (d) cooling the mixture to produce the coating for application onto the egg shell surface.

2. The method of claim 1 wherein subsequent to step (a) of the method, further comprising adding an acid to lower the pH of said mixture.

3. The method of claim 1 wherein prior to step (b) of the method, further comprising adding a diol, triol or polyol and incorporating said diol, triol or polyol singularly or in combination to said mixture; wherein said diol is selected from the group consisting of propylene glycol, propanediol 1,3 and combinations thereof; and wherein said polyol is a sugar alcohol selected from the group consisting of a 3-carbon, 4-carbon, 5-carbon, 6-carbon, 7-carbon, 12 carbon sugar, glycerin, arabitol, erythritol, glycitol, lactitol, maltitol, mannitol, sorbitol, xylitol and combinations thereof.

4. The method of claim 1 wherein prior to step (b) the method further comprising adding to said mixture one or more of a water and food grade acid; bacterial alpha amylase, plasticizer, a sugar, a starch, cellulose, cellulose esters, gelatin, agar, gluten, casein protein.

5. The method of claim 4, wherein said plasticizer is selected from the group consisting of glycerin, arabitol, erythritol, glycitol, lactitol, mannitol, sorbitol, isomalt, xylitol and combinations thereof.

6. The method of claim 4, wherein the sugar is selected from one or more monosaccharides, disaccharides or polysaccharides and wherein said monosaccharide is selected from the group consisting of glucose and fructose, said disaccharide is selected from the group consisting of sucrose, lactose or maltose and said polysaccharide is selected from the group consisting of cellulose, glycogen, oligosaccharides and combinations thereof.

7. The method of claim 4, wherein one or more starches is selected from the group consisting of rice, whet, maize, potato, cassava, acorn, arrowroot, arracacha, banana, barley, breadfruit, buckwheat, *canna, colocasia*, katakuri, kudzu, malanga, millet, oats, oca, Polynesian arrowroot, sago, sorghum, sweet potato, rye, taro, chestnuts, water chestnuts, yams, beans, fava, lentil, mung bean, peas, and chickpeas.

8. The method of claim 4, wherein the cellulose is selected from the group consisting of hydroxypropyl cellulose (HPC), hydroxypropyl methylcellulose (HPMC), carboxymethylcellulose (CMC), or methylcellulose (MC) and combinations thereof.

9. The method of claim 1, wherein prior to step (c) of the method, further comprising adding a food grade day to said mixture: wherein said food grade clay is one or more days selected from the group consisting of bentonite clay, kaolinite, montmorillonite and combinations thereof.

10. The method of claim 1, wherein prior to step (c) of the method, further comprising adding a silicone to said mixture; wherein the silicon is one or more selected from the group consisting of polydimethylsiloxane and a food safe silicone.

11. The method of claim 1 wherein said food grade emulsifier is selected from the group consisting of glucose or fructose, sucrose, lactose, maltose, cellulose, glycogen, oligosaccharides and combinations thereof.

12. The method of claim 1, wherein the food grade wax is selected from the group consisting of beeswax, microcrystalline wax and combinations thereof.

13. A method of producing a multiple colored egg, the method comprising:
   providing a coating for reducing penetration of food dyes on an egg shell surface, wherein said coating is made by the following steps;
   (a) admixing an edible salt compound with water in combination with a hydroxide where the molar weight of hydroxide to water is in a range of 1:1 to 1:30 to form a mixture;
   (b) adding a food grade emulsifier and a fatty acid to the mixture separately or together as a combination;
   (c) heating the solution to a temperature between 135-200° F. and adding a food grade wax;
   (d) cooling the mixture to produce the coating for application onto the egg shell surface;
   (e) applying at least one sticker to the egg shell surface;
   (f) dipping the egg in food grade food coloring of a first color;
   (g) softening the coating and applying the coating to the egg shell surface;
   (h) removing the at least one sticker;
   (i) dipping the egg in food grade food coloring of a second color;
   (j) removing the coating from the egg shell surface to produce a multicolored egg; and
   wherein steps f) through i) are optionally repeated.

14. A method of making a coating for reducing penetration of food dyes on an egg shell surface, the method comprising:
   (a) admixing an edible salt compound with water in combination with a hydroxide where the molar weight of hydroxide to water is in a range of 1:1 to 1:30 to form a mixture;
   (b) adding a food grade emulsifier and a fatty acid to the mixture separately or together as a combination;
   (c) heating the solution to a temperature between 135-200"F and adding a food grade wax;
   (d) cooling the mixture;
   (e) adding an adhesive to the mixture, wherein the adhesive is produced by admixing sugar, water and a polyfunctional acid to form a second mixture, wherein the molar ratio of sugar to water is in the range of 1:2 to 1:60 and wherein the acid in the second mixture is in an amount of 2-16% by weight: wherein the second mixture is heated to a boiling temperature, and maintaining the mixture at said boiling temperature until the sugar is substantially cross-linked by the acid to provide said adhesive.

15. The method of claim 14 wherein said polyfunctional acid is selected from the group consisting of acetic, citric, glycolic, lactic, malic, tartaric, mandelic, fumaric and phosphoric acid and combinations thereof.

16. The method of claim 14, wherein the food grade wax is selected from the group consisting of unbleached beeswax, bleached beeswax, carnuba wax, candelilla wax, paraffin wax, synthetic paraffin wax, ceresin wax, rice bran wax, microcrystalline wax and combinations thereof.

\* \* \* \* \*